(12) United States Patent
McKinney et al.

(10) Patent No.: US 10,794,595 B2
(45) Date of Patent: Oct. 6, 2020

(54) STEPPED HEAT SHIELD FOR A TURBINE ENGINE COMBUSTOR

(71) Applicant: United Technologies Corporation, Hartford, CT (US)

(72) Inventors: Randal G. McKinney, Tolland, CT (US); Frank J. Cunha, Avon, CT (US); Stanislav Kostka, Jr., Northbridge, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 338 days.

(21) Appl. No.: 15/113,536

(22) PCT Filed: Feb. 3, 2015

(86) PCT No.: PCT/US2015/014281
§ 371 (c)(1),
(2) Date: Jul. 22, 2016

(87) PCT Pub. No.: WO2015/117139
PCT Pub. Date: Aug. 6, 2015

(65) Prior Publication Data
US 2017/0009987 A1 Jan. 12, 2017

Related U.S. Application Data

(60) Provisional application No. 61/935,135, filed on Feb. 3, 2014.

(51) Int. Cl.
*F23R 3/00* (2006.01)
*F23R 3/06* (2006.01)
*F02C 7/24* (2006.01)

(52) U.S. Cl.
CPC ............... *F23R 3/002* (2013.01); *F02C 7/24* (2013.01); *F23R 3/06* (2013.01); *F05D 2220/32* (2013.01);
(Continued)

(58) Field of Classification Search
CPC .... F23R 3/002; F23R 3/06; F23R 3/04; F23R 2900/03041–03044; F23R 3/16;
(Continued)

(56) References Cited

U.S. PATENT DOCUMENTS 4,265,085 A    5/1981   Fox et al.
4,302,941 A *  12/1981  DuBell ................... F23R 3/08
                                                            60/757
(Continued)

FOREIGN PATENT DOCUMENTS

FR    2966910 A1   5/2012
GB    2298266 A    8/1996

OTHER PUBLICATIONS

EP search report for EP15743262.6 dated Jan. 30, 2017.

*Primary Examiner* — Alain Chau
(74) *Attorney, Agent, or Firm* — Getz Balich LLC (57) ABSTRACT

An assembly is provided for a turbine engine. This turbine engine assembly includes a combustor wall with a shell and a heat shield. The combustor wall defines a quench aperture therethrough. The combustor wall also defines a cavity between the shell and the heat shield. The shell defines a first aperture through which air is directed into the cavity. The heat shield includes a rail that at least partially defines a second aperture configured to direct at least some of the air within the cavity out of the combustor wall and towards the quench aperture.

16 Claims, 10 Drawing Sheets

(52) U.S. Cl.
CPC .... *F05D 2240/35* (2013.01); *F05D 2260/201* (2013.01); *F05D 2260/202* (2013.01); *F23R 2900/03041* (2013.01); *F23R 2900/03042* (2013.01); *F23R 2900/03044* (2013.01)

(58) Field of Classification Search
CPC ........ F23R 3/26; F23R 3/08; F05D 2260/201; F05D 2260/202; F05D 2220/32; F05D 2240/35; F23M 5/085; F02C 7/24
See application file for complete search history.

(56) References Cited

U.S. PATENT DOCUMENTS

| | | | | |
|---|---|---|---|---|
| 4,446,693 A * | 5/1984 | Pidcock | ............... | F23R 3/002 60/757 |
| 4,485,630 A * | 12/1984 | Kenworthy | ............ | B23P 15/00 416/97 R |
| 4,567,730 A * | 2/1986 | Scott | ............... | F23R 3/007 60/752 |
| 4,628,694 A * | 12/1986 | Kelm | ............... | B21D 35/00 60/752 |
| 4,695,247 A * | 9/1987 | Enzaki | ............... | F23R 3/002 431/351 |
| 4,773,227 A * | 9/1988 | Chabis | ............... | F23R 3/002 60/752 |
| 4,934,145 A | 6/1990 | Zeisser | | |
| 5,209,067 A * | 5/1993 | Barbier | ............... | F23R 3/06 60/757 |
| 5,461,866 A | 10/1995 | Sullivan et al. | | |
| 5,758,503 A | 6/1998 | DuBell et al. | | |
| 6,408,628 B1 * | 6/2002 | Pidcock | ............... | F23R 3/002 60/752 |
| 6,606,861 B2 | 8/2003 | Snyder | | |
| 7,000,397 B2 * | 2/2006 | Pidcock | ............... | F23R 3/002 60/752 |
| 7,093,411 B2 | 8/2006 | Wallis | | |
| 7,146,815 B2 | 12/2006 | Burd | | |
| 7,886,541 B2 * | 2/2011 | Woolford | ............... | F23R 3/002 60/752 |
| 8,443,610 B2 | 5/2013 | Hoke et al. | | |
| 8,978,385 B2 * | 3/2015 | Cunha | ............... | F23R 3/002 60/752 |
| 9,010,122 B2 * | 4/2015 | Bangerter | ............... | F23R 3/06 60/752 |
| 9,416,970 B2 * | 8/2016 | Kirsopp | ............... | F23R 3/002 |
| 2002/0124572 A1 | 9/2002 | Pidcock et al. | | |
| 2003/0213250 A1 | 11/2003 | Pacheco-Tougas et al. | | |
| 2010/0095679 A1 | 4/2010 | Rudrapatna et al. | | |
| 2010/0251722 A1 * | 10/2010 | Woolford | ............... | F23R 3/002 60/755 |
| 2010/0287941 A1 | 11/2010 | Kim et al. | | |
| 2011/0048024 A1 | 3/2011 | Snyder et al. | | |
| 2013/0025287 A1 * | 1/2013 | Cunha | ............... | F23R 3/002 60/772 |
| 2013/0192233 A1 | 8/2013 | Eastwood et al. | | |
| 2014/0030064 A1 * | 1/2014 | Bangerter | ............... | F23R 3/06 415/115 |
| 2014/0250894 A1 * | 9/2014 | Petty, Sr. | ............... | F23R 3/60 60/754 |

* cited by examiner

STEPPED HEAT SHIELD FOR A TURBINE ENGINE COMBUSTOR

This application claims priority to PCT Patent Application No. PCT/US15/014281 filed Feb. 3, 2015 which claims priority to U.S. Patent Application No. 61/935,135 filed Feb. 3, 2014, which are hereby incorporated herein by reference in their entireties.

BACKGROUND OF THE INVENTION

1. Technical Field

This disclosure relates generally to a turbine engine and, more particularly, to a combustor for a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield, which defines a respective radial side of a combustion chamber. Cooling cavities extend radially between the heat shield and the shell. These cooling cavities may fluidly couple impingement apertures defined in the shell with effusion apertures defined in the heat shield.

Each combustor wall may also include a plurality of quench aperture grommets located between the shell and the heat shield. Each of the quench aperture grommets defines a respective quench aperture radially through the combustor wall. The quench aperture grommets as well as adjacent portions of the heat shield are typically subject to relatively high temperatures during turbine engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. This turbine engine assembly includes a combustor wall with a shell and a heat shield. The combustor wall defines a quench aperture therethrough. The combustor wall also defines a cavity between the shell and the heat shield. The shell defines a first aperture through which air is directed into the cavity. The heat shield includes a rail that at least partially defines a second aperture configured to direct at least some of the air within the cavity out of the combustor wall and towards the quench aperture.

According to another aspect of the invention, another assembly is provided for a turbine engine. This turbine engine assembly includes a combustor wall with a shell and a heat shield. The combustor wall defines a quench aperture through the shell and the heat shield. The combustor wall also defines a cavity between the shell and the heat shield. The shell is configured to direct air into the cavity. The heat shield has a stepped configuration with a riser portion extending between upstream and downstream run portions. The riser portion is configured to direct at least some of the air within the cavity out of the combustor wall and towards the quench aperture.

According to still another aspect of the invention, another assembly is provided for a turbine engine. This turbine engine assembly includes a combustor wall, which includes and defines a cavity between a shell and a heat shield. The shell is configured to direct air into the cavity. The heat shield has a stepped configuration with a riser portion extending between upstream and downstream run portions. The riser portion is configured to direct some of the air within the cavity out of the combustor wall to film cool the downstream run portion. The upstream run portion is configured to direct some of the air within the cavity to effuse out of the combustor wall.

The combustor wall may define a quench aperture through the shell and the downstream run portion. The riser portion may be configured to direct the respective air within the cavity out of the combustor wall to the quench aperture.

The heat shield may have a stepped configuration.

The heat shield may include a first panel adjacent a second panel. The first panel may include the rail. The quench aperture may extend through the second panel.

The quench aperture may extend vertically through the combustor wall. Adjacent ends of the first and the second panels may be vertically displaced from one another.

The rail may be disposed at an end of the first panel. The rail, for example, may be disposed on, adjacent or proximate the end of the first panel.

The heat shield may include a base configured as an arcuate plate. The rail may extend between the base and the shell.

The rail may be configured such that the air directed through the second aperture forms an air blanket against the heat shield flow towards a region of the heat shield at the quench aperture.

The second aperture may extend along a centerline through the rail. The centerline may be substantially parallel to a portion of the heat shield through which the quench aperture extends.

The second aperture may be configured as or include a slot.

The second aperture may be one of a plurality of second apertures that are at least partially defined by the rail and through which at least some of the air within the cavity may be directed out of the combustor wall and towards the quench aperture.

The first aperture may be configured as or include an impingement aperture through which the air may be directed into the cavity to impinge against the heat shield.

The heat shield may define an effusion aperture through which some of the air within the cavity may be directed out of the combustor wall.

The riser portion may include a rail.

The riser portion may at least partially define a slot through which the at least some of the air within the cavity may be directed out of the combustor wall.

The riser portion may at least partially define a plurality of apertures through which the at least some of the air within the cavity may be directed out of the combustor wall.

The heat shield may include an upstream panel that defines the upstream run portion and/or the riser portion. The heat shield may also include a downstream panel that defines the downstream run portion.

The upstream run portion may be configured to direct some of the air within the cavity out of the combustor wall.

The foregoing features and the operation of the invention will become more apparent in light of the following description and the accompanying drawings.

DETAILED DESCRIPTION OF THE INVENTION

Figure 1:
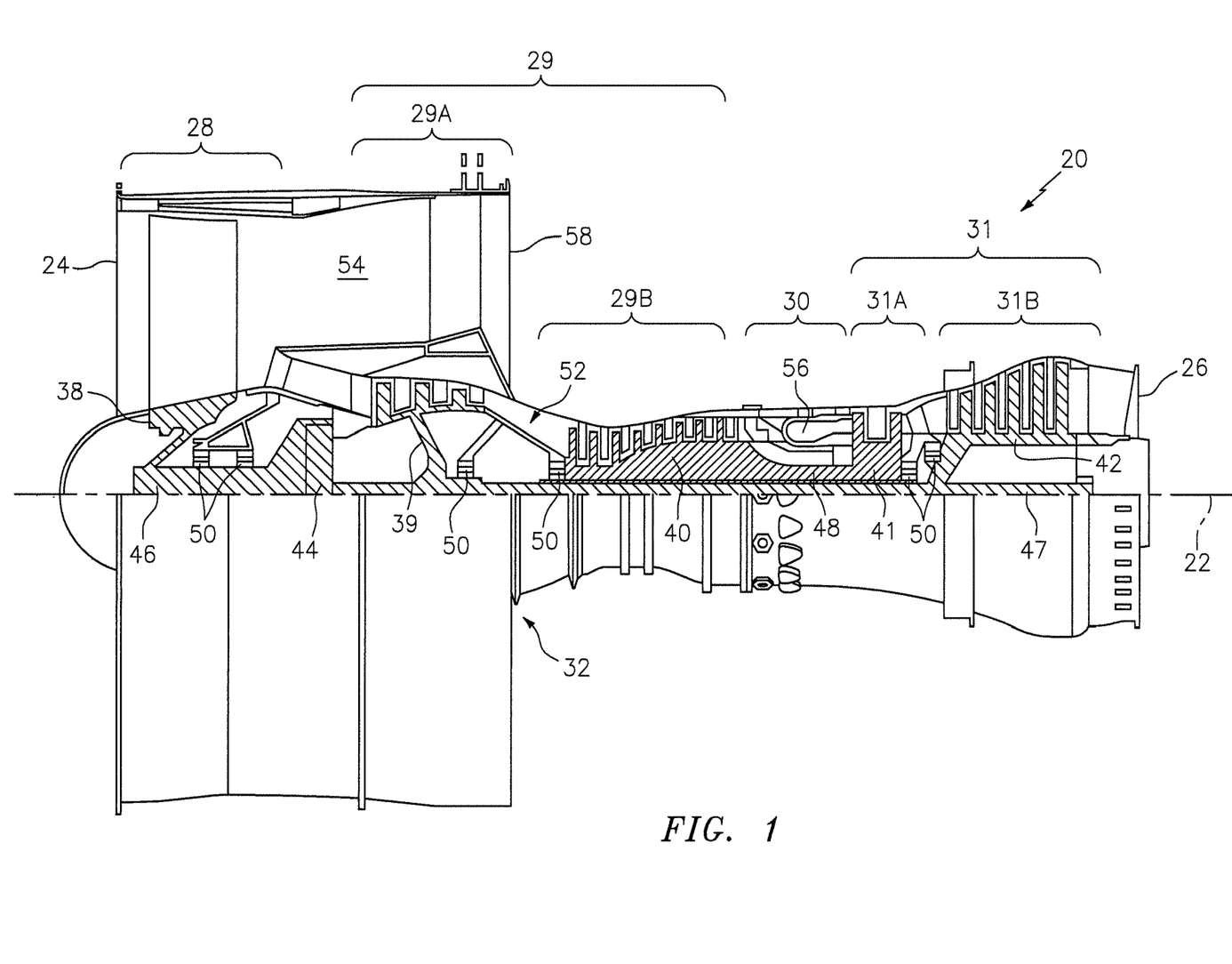
FIG. 1 is a side cutaway illustration of a geared turbine engine.

FIG. 1 is a side cutaway illustration of a geared turbine engine 20. This turbine engine 20 extends along an axial centerline 22 between a forward and upstream airflow inlet 24 and an aft and downstream core airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 32.

Each of the engine sections 28, 29A, 29B, 31A and 31B includes a respective rotor 38-42. Each of the rotors 38-42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 38 is connected to a gear train 44 through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50. Each of the bearings 50 is connected to the engine housing 32 by at least one stationary structure such as, for example, an annular support strut.

Air enters the turbine engine 20 through the airflow inlet 24, and is directed through the fan section 28 and into an annular core gas path 52 and an annular bypass gas path 54. The air within the core gas path 52 may be referred to as "core air". The air within the bypass gas path 54 may be referred to as "bypass air".

The core air is directed through the engine sections 29-31 and exits the turbine engine 20 through the core airflow exhaust 26. Within the combustor section 30, fuel is injected into a combustion chamber 56 and mixed with the core air. This fuel-core air mixture is ignited to power the turbine engine 20 and provide forward engine thrust. The bypass air is directed through the bypass gas path 54 and out of the turbine engine 20 through a bypass nozzle 58 to provide additional forward engine thrust. Alternatively, the bypass air may be directed out of the turbine engine 20 through a thrust reverser to provide reverse engine thrust.

Figure 2:
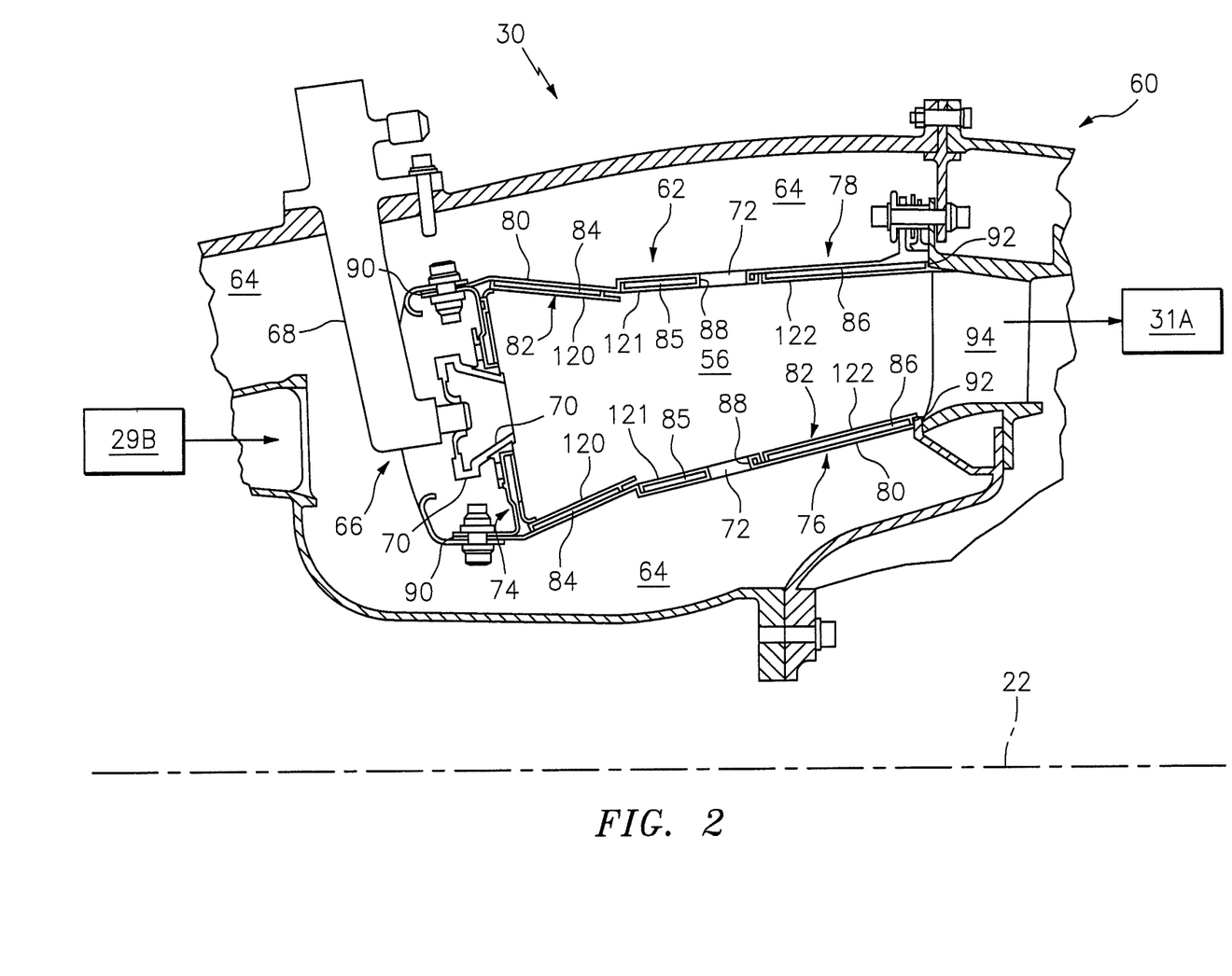
FIG. 2 is a side cutaway illustration of a portion of a combustor section.

FIG. 2 illustrates an assembly 60 of the turbine engine 20. The turbine engine assembly 60 includes a combustor 62 disposed within an annular plenum 64 of the combustion section 30. This plenum 64 receives compressed core air from the HPC section 29B, and provides the received core air to the combustor 62 as described below in further detail.

Figure 3:
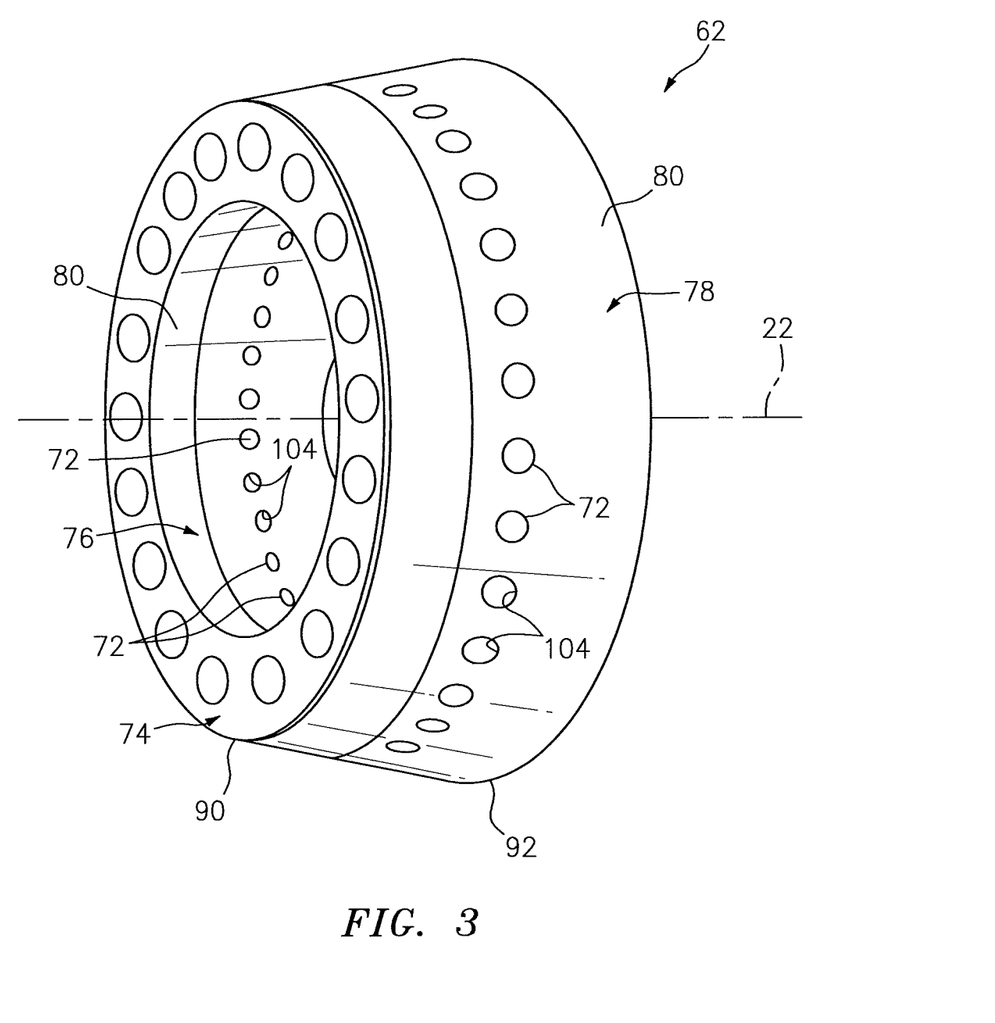
FIG. 3 is a perspective illustration of a portion of a combustor.

The turbine engine assembly 60 also includes one or more fuel injector assemblies 66. Each fuel injector assembly 66 may include a fuel injector 68 mated with a swirler 70. The fuel injector 68 injects the fuel into the combustion chamber 56. The swirler 70 directs some of the core air from the plenum 64 into the combustion chamber 56 in a manner that facilitates mixing the core air with the injected fuel. One or more igniters (not shown) ignite the fuel-core air mixture. Quench apertures 72 (see also FIG. 3) in walls of the combustor 62 direct additional core air into the combustion chamber 56 to quench the ignited fuel-core air mixture to become, for example, stoichiometrically lean.

The combustor 62 may be configured as an annular floating wall combustor. The combustor 62 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the HPT section 31A, thereby defining the combustion chamber 56.

Each of the combustor walls 76, 78 may be a multi-walled structure; e.g., a hollow dual-walled stepped structure. Each combustor wall 76, 78 of FIG. 2, for example, includes a tubular combustor shell 80 and a tubular combustor heat shield 82 with one or more cooling cavities 84-86 (e.g., impingement cavities) between the shell 80 and the heat shield 82. Each combustor wall 76, 78 may also include one or more annular quench aperture bodies 88 (e.g., grommets). These quench aperture bodies 88 are disposed circumferentially around the centerline 22. Each quench aperture body 88 partially or completely defines a respective one of the quench apertures 72.

The shell 80 extends circumferentially around the centerline 22. The shell 80 extends axially along the centerline 22 between an upstream and axial forward end 90 and a downstream and axial aft end 92. The shell 80 is connected to the bulkhead 74 at the forward end 90. The shell 80 may be connected to a stator vane assembly 94 or the HPT section 31A at the aft end 92.

Figure 4:
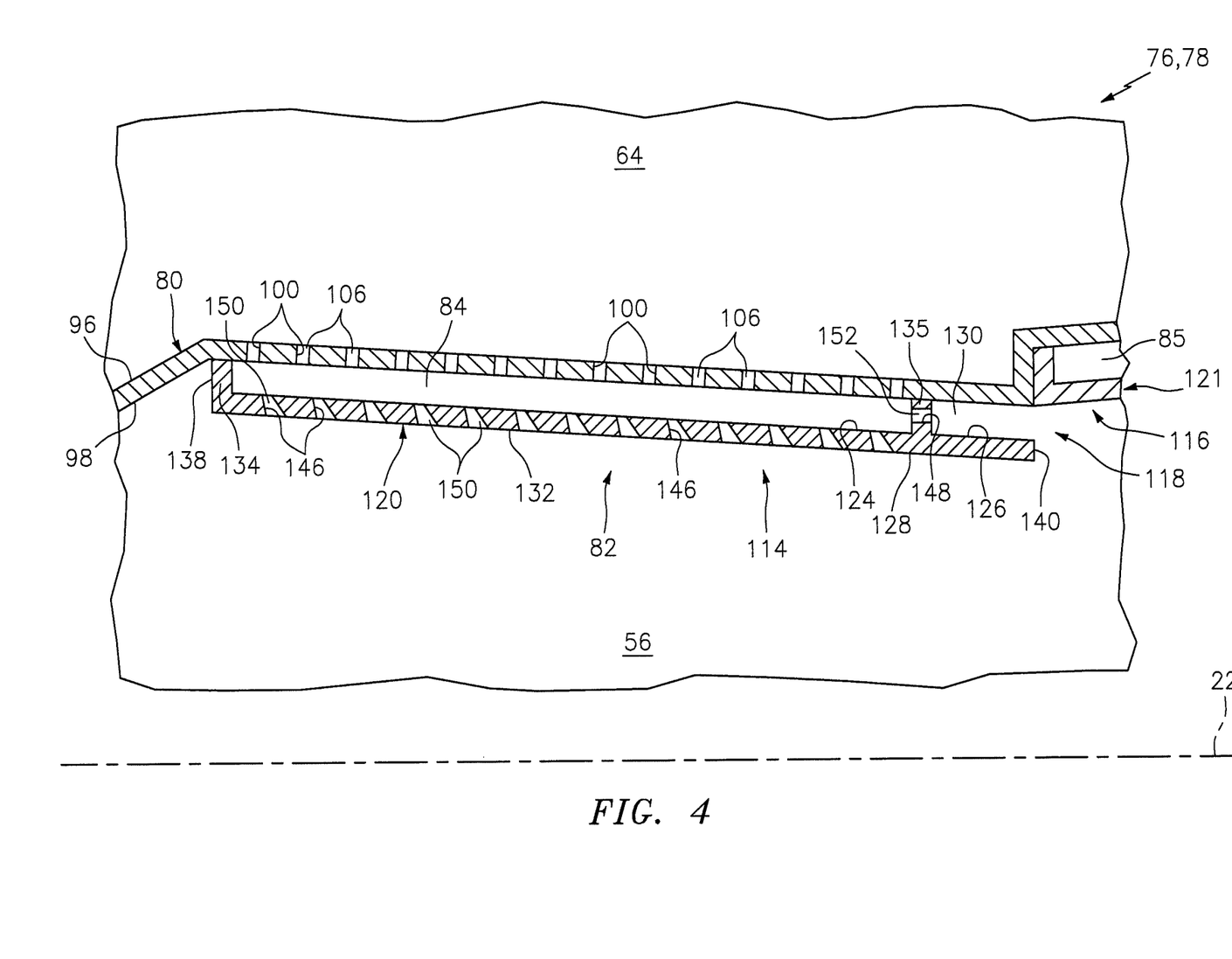
FIG. 4 is a side sectional illustration of an upstream portion of a combustor wall.
Figure 5:
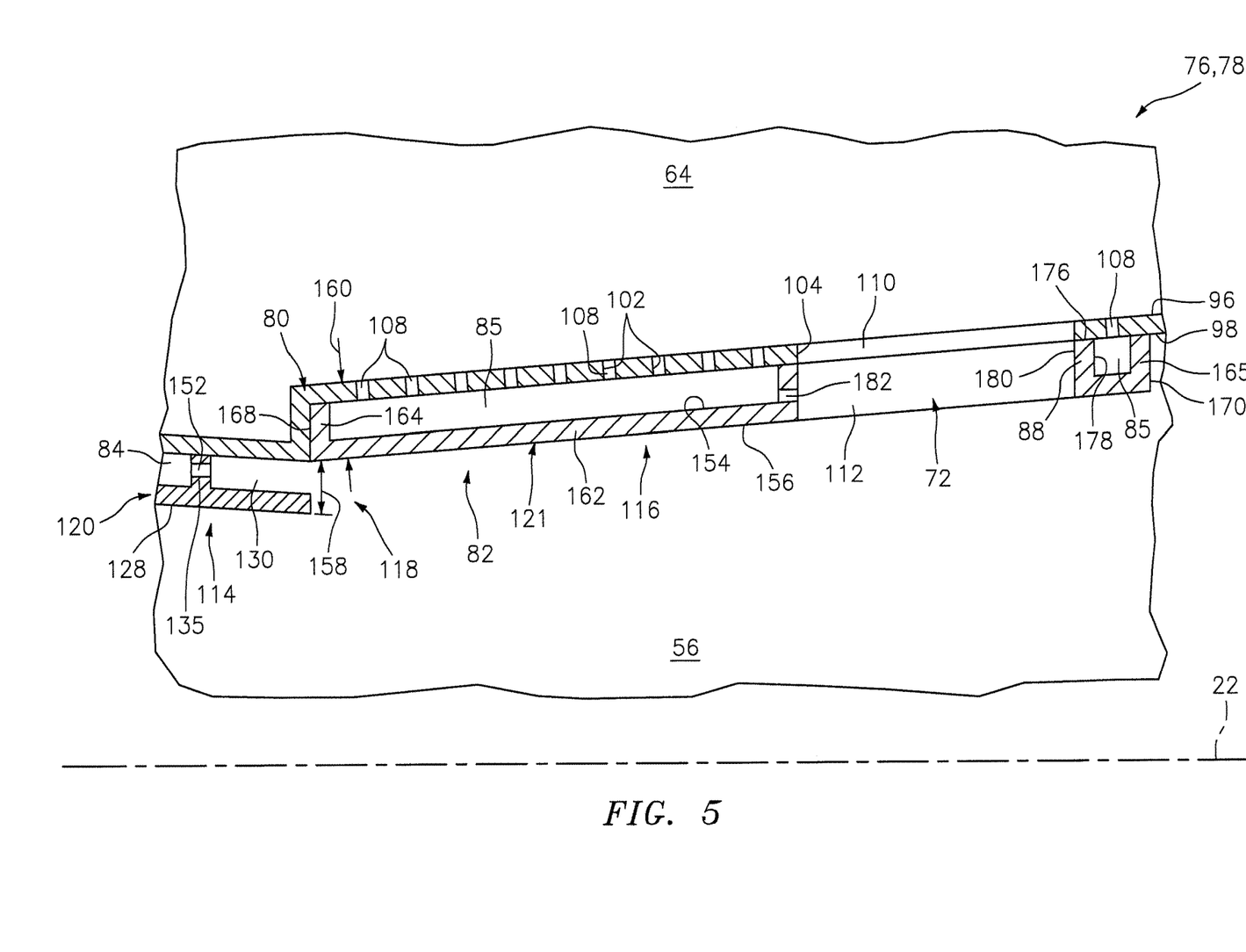
FIG. 5 is a side sectional illustration of a downstream portion of the combustor wall.

Referring to FIGS. 4 and 5, the shell 80 has an exterior surface 96, an interior surface 98, one or more aperture surfaces 100, one or more aperture surfaces 102, and one or more aperture surfaces 104. At least a portion of the shell 80 extends vertically (e.g., radially) between the shell exterior surface 96 and the shell interior surface 98. The shell exterior surface 96, which may also be referred to as a plenum surface, defines a portion of a boundary of the plenum 64. The shell interior surface 98, which may also be referred to as a cavity surface, defines a portion of a boundary of one or more of the cavities 84-86 (see also FIG. 2).

Referring to FIG. 4, the aperture surfaces 100 may be arranged in one or more arrays disposed along the centerline 22. The aperture surfaces 100 in each array may be arranged circumferentially around the centerline 22. Each of the aperture surfaces 100 defines a cooling aperture 106. This cooling aperture 106 extends vertically (e.g., radially)

through the shell 80 from the shell exterior surface 96 to the shell interior surface 98. The cooling aperture 106 may be configured as an impingement aperture. Each aperture surface 100 of FIG. 4, for example, is configured to direct a jet of cooling air to impinge (e.g., substantially perpendicularly) against the heat shield 82.

Referring to FIG. 5, the aperture surfaces 102 may be arranged in one or more arrays disposed along the centerline 22. The aperture surfaces 102 in each array may be arranged circumferentially around the centerline 22. Each of the aperture surfaces 102 defines a cooling aperture 108. This cooling aperture 108 extends vertically through the shell 80 from the shell exterior surface 96 to the shell interior surface 98. The cooling aperture 108 may be configured as an impingement aperture. Each aperture surface 102 of FIG. 5, for example, is configured to direct a jet of cooling air to impinge (e.g., substantially perpendicularly) against the heat shield 82.

The aperture surfaces 104 may be arranged circumferentially around the centerline 22 in an array. Each aperture surface 104 defines an aperture 110. The aperture 110 extends vertically through the shell 80 from the shell exterior surface 96 to the shell interior surface 98. The aperture surface 104 of FIG. 5 is configured such that the aperture 110 is aligned with an aperture 112 defined by a respective one of the quench aperture bodies 88, where the apertures 110 and 112 collectively form a respective one of the quench apertures 72. Alternatively, the aperture surface 104 may be configured such that the aperture 110 receives a respective one of the quench aperture bodies 88.

Referring to FIG. 2, the heat shield 82 extends circumferentially around the centerline 22. The heat shield 82 extends axially along the centerline 22 between an axial forward end and an axial aft end. The forward end is located at (e.g., on, adjacent or proximate) an interface between the combustor wall 76, 78 and the bulkhead 74. The aft end may be located at an interface between the combustor wall 76, 78 and the stator vane assembly 94 and/or the HPT section 31A.

The heat shield 82 has a stepped configuration. The heat shield 82 of FIGS. 4 and 5, for example, includes one or more run portions 114 and 116 and at least one riser portion 118. The upstream and the downstream run portions 114 and 116 may each be arranged generally parallel to the centerline 22 and/or to one another. Alternatively, one or more of the run portions 114 and 116 may each be acutely angled relative to the centerline 22 and/or one another. At least an upstream end of the downstream run portion 116 may be vertically recessed into the combustor wall 76, 78 from at least a downstream end of the upstream run portion 114. The riser portion 118, for example, extends vertically between the upstream and the downstream run portions 114 and 116.

Referring to FIG. 2, the heat shield 82 may include a plurality of panel arrays sequentially arranged along the centerline 22. Each of these panel arrays respectively includes a plurality of panels 120-122. The panels 120-122 in each array are disposed circumferentially around the centerline 22 and form a hoop. Alternatively, the heat shield 82 may be configured from a plurality of tubular panels sequentially arranged along the centerline 22. The panels 120 may form the upstream run portion 114 and/or the riser portion 118. The panels 121 may form the downstream run portion 116.

Figure 6:
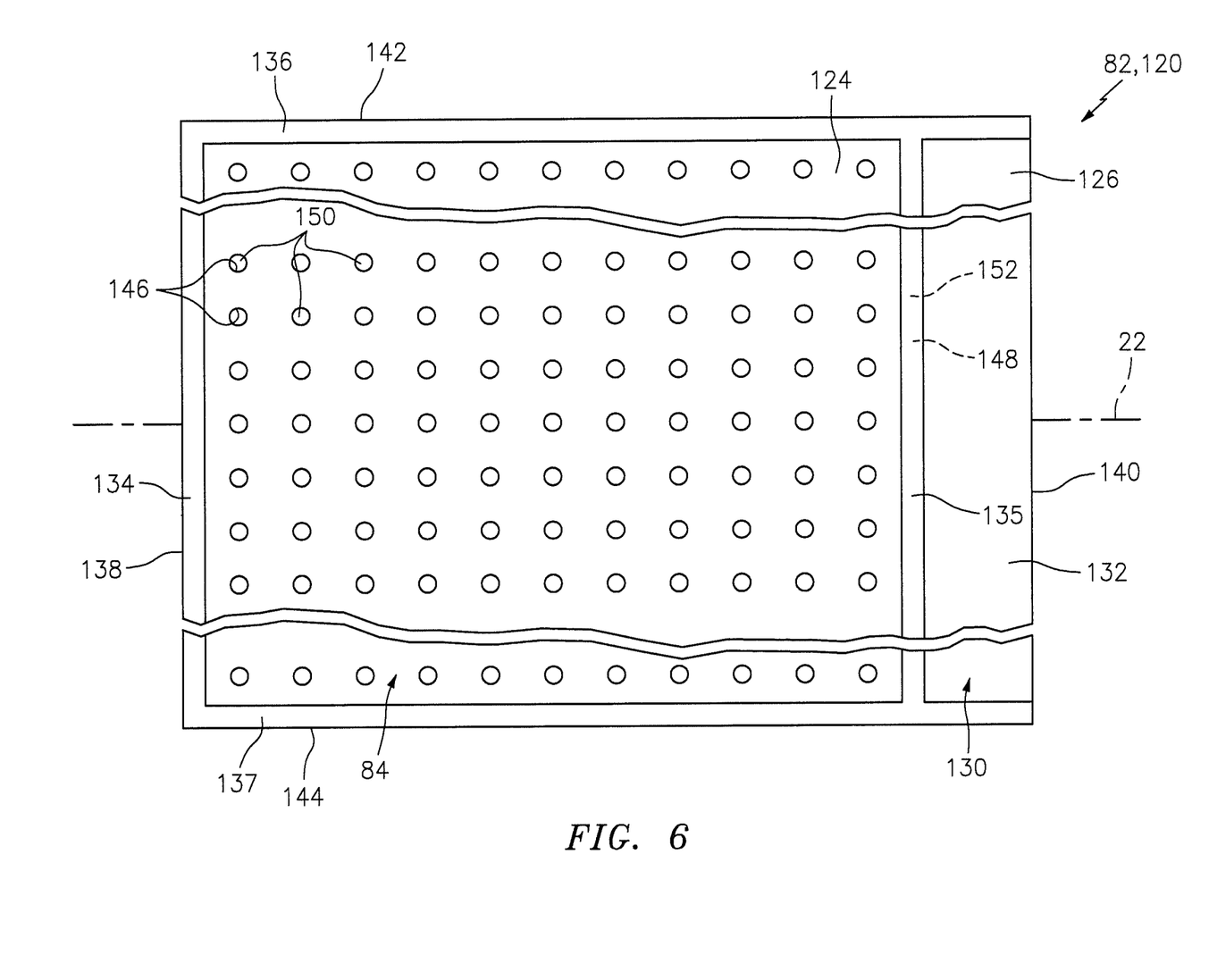
FIG. 6 is an illustration of an upstream heat shield panel with a recessed cooling aperture shown by dashed lines.

Referring to FIGS. 4 and 6, each of the panels 120 has one or more interior surfaces 124 and 126 and an exterior surface 128. At least a portion of the panel 120 extends vertically between the interior surfaces 124 and 126 and the exterior surface 128. The interior surface 124, which may also be referred to as a cavity surface, defines a portion of a boundary of a respective one of the cooling cavities 84. The interior surface 126, which may also be referred to as a channel (or cavity) surface, defines a portion of a boundary of a cooling channel 130 (or open cavity). The exterior surface 128, which may also be referred to as a chamber surface, defines a portion of a boundary of the combustion chamber 56.

Each panel 120 includes a panel base 132 and one or more panel rails 134-137. The panel base 132 and the panel rails 134-137 may collectively define the interior surface 124. The panel base 132 and the panel rails 135-137 may collectively define the interior surface 126. The panel base 132 may define the exterior surface 128.

The panel base 132 may be configured as a generally curved (e.g., arcuate) plate. The panel base 132 extends axially between an upstream and axial forward end 138 and a downstream and axial aft end 140. The panel base 134 extends laterally (e.g., circumferentially) between opposing lateral ends 142 and 144.

The panel rails may include one or more axial end rails 134 and 135 and one more lateral end rails 136 and 137. Each of the panel rails 134-137 of the inner wall 76 extends radially in from the respective panel base 132; see FIG. 2. Each of the panel rails 134-137 of the outer wall 78 extends radially out from the respective panel base 132; see FIG. 2.

The axial end rails 134 and 135 extend laterally (e.g., circumferentially) between and are connected to the lateral end rails 136 and 137. The axial end rail 134 is arranged adjacent (or proximate) the forward end 138. The axial end rail 135 is arranged proximate (or adjacent) the aft end 140. The lateral end rail 136 is arranged adjacent (or proximate) the lateral end 142. The lateral end rail 137 is arranged adjacent (or proximate) the lateral end 144.

Each panel 120 also includes one or more aperture surfaces 146 and at least one aperture surface 148. The aperture surfaces 146 may be arranged in one or more arrays disposed along the centerline 22. The aperture surfaces 146 in each array may be arranged about the centerline 22. Each of the aperture surfaces 146 defines a cooling aperture 150. This cooling aperture 150 extends vertically through the panel base 132 from the panel interior surface 124 to the panel exterior surface 128. The cooling aperture 150 may be configured as an effusion aperture. Each aperture surface 146 of FIG. 4, for example, is configured to direct a jet of cooling air into the combustion chamber 56 to film cool a downstream portion of the heat shield 82. Each aperture surface 146 may extend along a centerline that is acutely angled relative to the surfaces 124 and/or 128.

The aperture surface 148 defines a cooling aperture 152; e.g., a circumferentially elongated slot. This cooling aperture 152 extends (e.g., axially) through the axial end rail 135 along a centerline, which may be generally parallel to the surface 128. The aperture surface 148 is configured to direct a film of cooling air from the aft end 140 of the panel 120; e.g., from the riser portion 118. This film of cooling air may flow along at least a portion of one of the panels 121 (e.g., the downstream run portion 116) towards a respective one of the quench apertures 72 as described below in further detail. The aperture surface 148, for example, may be approximately laterally (e.g., circumferentially) aligned with a respective one of the quench apertures 72 as shown in FIG. 5.

Figure 7:
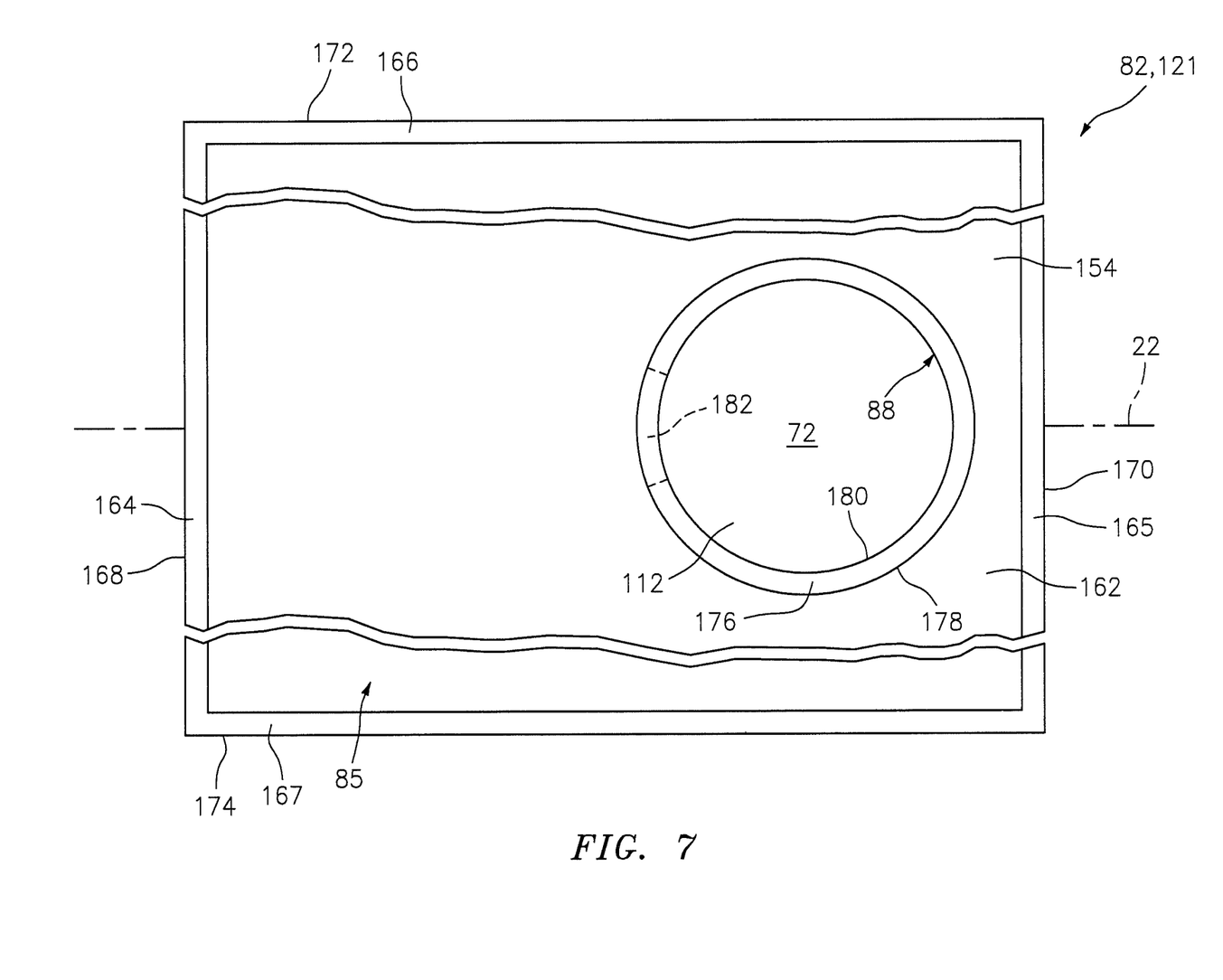
FIG. 7 is an illustration of a downstream heat shield panel with a recessed cooling aperture shown by dashed lines.

Referring to FIGS. 5 and 7, each of the panels 121 has an interior surface 154 and an exterior surface 156. At least a portion of the panel 121 extends vertically between the interior surface 154 and the exterior surface 156. The interior surface 154, which may also be referred to as a cavity surface, defines a portion of a boundary of a respective one of the cooling cavities 85. The exterior surface 156, which may also be referred to as a chamber surface, defines a portion of a boundary of the combustion chamber 56. The exterior surface 156 is vertically displaced from the exterior surface 128 of an adjacent one of the panels 120 at its upstream end 168 by a distance 158. This distance 158 may be substantially equal to a vertical thickness 160 of the respective panel 121. Alternatively, the distance 158 may be less than or greater than the vertical thickness 160.

Each panel 121 includes a panel base 162 and one or more panel rails 164-167. The panel base 162 and the panel rails 164-167 may collectively define the interior surface 154. The panel base 162 may define the exterior surface 156.

The panel base 162 may be configured as a generally curved (e.g., arcuate) plate. The panel base 162 extends axially between the upstream and axial forward end 168 and a downstream and axial aft end 170. The panel base 162 extends laterally (e.g., circumferentially) between opposing lateral ends 172 and 174.

The panel rails may include one or more axial end rails 164 and 165 and one more lateral end rails 166 and 167. Each of the panel rails 164-167 of the inner wall 76 extends radially in from the respective panel base 162; see FIG. 2. Each of the panel rails 164-167 of the outer wall 78 extends radially out from the respective panel base 162; see FIG. 2.

The axial end rails 164 and 165 extend laterally (e.g., circumferentially) between and are connected to the lateral end rails 166 and 167. The axial end rail 164 is arranged adjacent (or proximate) the forward end 168. The axial end rail 165 is arranged adjacent (or proximate) the aft end 170. The lateral end rail 166 is arranged adjacent (or proximate) the lateral end 172. The lateral end rail 167 is arranged adjacent (or proximate) the lateral end 174.

Each of the quench aperture bodies 88 may be formed integral with (or attached to) a respective one of the panel bases 162. At least one of the quench aperture bodies 88 is located laterally within and extend vertically through a respective one of the cooling cavities 85. At least one of the quench aperture bodies 88, for example, may be arranged laterally between the lateral end rails 166 and 167 of a respective one of the panels 121. At least one of the quench aperture bodies 88 may be arranged axially between the axial end rails 164 and 165 of a respective one of the panels 121.

Each quench aperture body 88 extends vertically from the panel base 162 to a distal end surface 176. The quench aperture body 88 extends laterally between a body outer surface 178 and a body inner surface 180, which at least partially defines a respective one of the quench apertures 72 in the combustor wall 76, 78. The body inner surface 180, for example, is aligned with a respective one of the aperture surfaces 104 and defines the through-hole 112 that extends vertically through the panel 121 from the end surface 176 to the exterior surface 156.

Referring to FIG. 2, the heat shield 82 of the inner wall 76 circumscribes the shell 80 of the inner wall 76, and defines an inner side of the combustion chamber 56. The heat shield 82 of the outer wall 78 is arranged radially within the shell 80 of the outer wall 78, and defines an outer side of the combustion chamber 56 that is opposite the inner side.

The heat shield 82 and, more particularly, each of the panels 120-122 may be respectively attached to the shell 80 by a plurality of mechanical attachments thereby forming the cooling cavities 84-86 in each combustor wall 76, 78. The mechanical attachments are not shown for ease of illustration. However, various mechanical attachments are known in the art and the present invention is not limited to any particular type or configuration thereof.

Referring to FIGS. 4 and 6, each cooling cavity 84 is defined and extends vertically between the interior surface 98 and a respective one of the interior surfaces 124 as set forth above. Each cooling cavity 84 is defined and extends laterally between the lateral end rails 136 and 137 of a respective one of the panels 120. Each cooling cavity 84 is defined and extends axially between the axial end rails 134 and 135 of a respective one of the panels 120. In this manner, each cooling cavity 84 may fluidly couple one or more of the cooling apertures 106 in the shell 80 with one or more of the cooling apertures 150 and 152 in the heat shield 82.

Referring to FIGS. 5 and 7, each cooling cavity 85 is defined and extends vertically between the interior surface 98 and a respective one of the interior surfaces 154 as set forth above. Each cooling cavity 85 is defined and extends laterally between the lateral end rails 166 and 167 of a respective one of the panels 121. Each cooling cavity 85 is defined and extends axially between the axial end rails 164 and 165 of a respective one of the panels 121. In this manner, each cooling cavity 85 may fluidly couple one or more of the cooling apertures 108 in the shell 80 with, for example, at least one cooling aperture 182 (e.g., slot) defined in the heat shield 82; e.g., defined in the quench aperture body 88.

Figure 8:
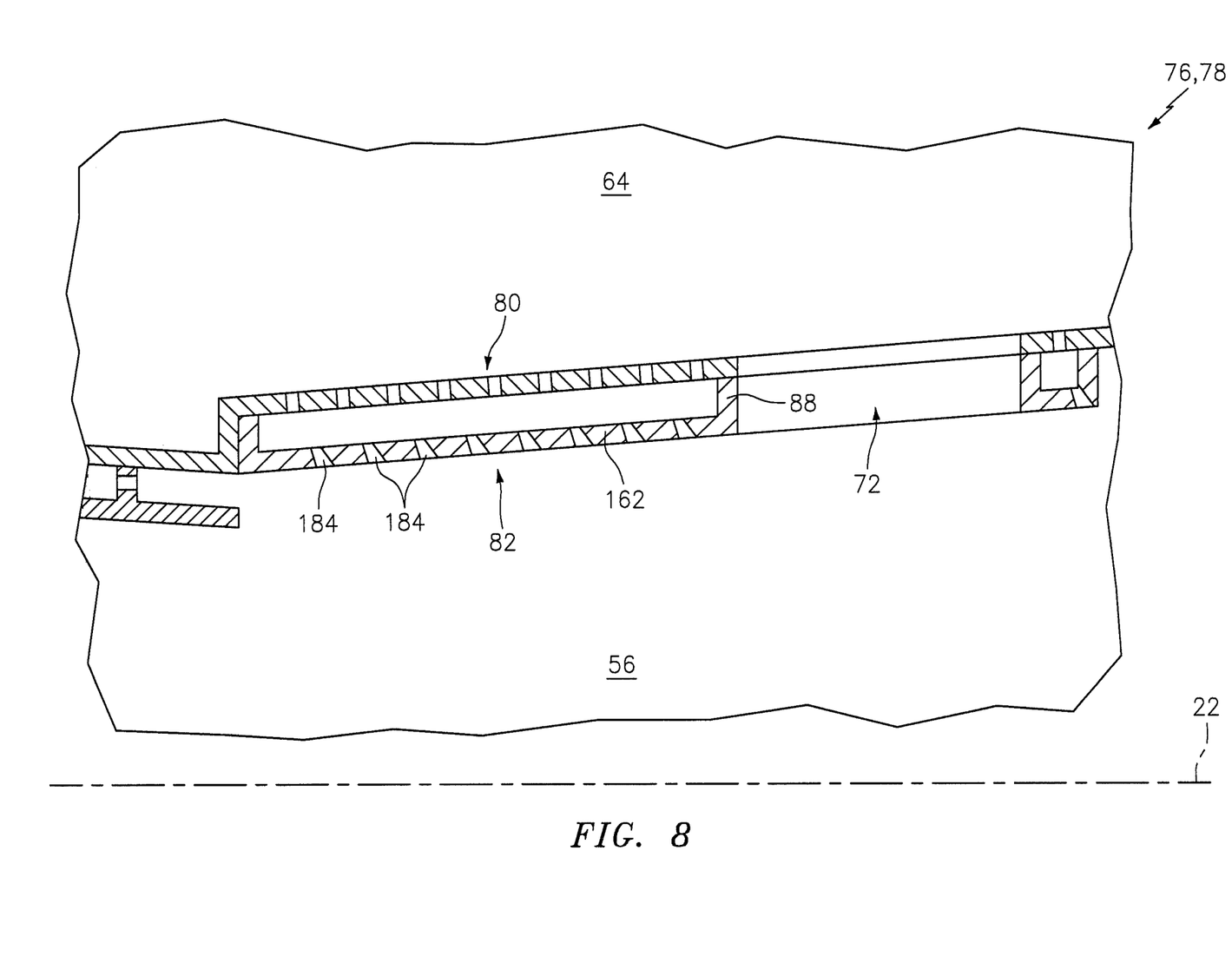
FIG. 8 is a side sectional illustration of a downstream portion of an alternate embodiment combustor wall.

Referring to FIGS. 4 and 5, during turbine engine operation, core air from the plenum 64 is directed into each cooling cavity 84 and 85 through respective cooling apertures 106 and 108. This core air (e.g., cooling air) may impinge against the respective panel base 132, 162, thereby impingement cooling the panel 120, 121 and the heat shield 82. The cooling air within each cooling cavity 84 is directed through the cooling apertures 150 and 152 into the combustion chamber 56 to film cool a downstream portion of the heat shield 82. The cooling air within each cooling cavity 85 is directed through the cooling aperture 182 into the quench aperture 72 to convectively cool the quench aperture body 88. Alternatively or additionally, referring to FIG. 8, the cooling air within each cooling cavity 85 may be directed through one or more cooling apertures 184 (e.g., effusion apertures) defined by the panel base 162.

Referring to FIG. 5, the cooling air discharged from each cooling aperture 152 may form an air blanket against the downstream run portion 116 (e.g., the exterior surface 156) that flows along a longitudinal path towards a respective one of the quench apertures 72. This air blanket may provide a thermal barrier between one or more portions of the heat shield 82 adjacent and/or proximate the quench aperture 72 and the relatively hot core air within the combustion chamber 56. The air blanket may also or alternatively convectively cool the respective portion(s) of the heat shield 82.

Figure 9:
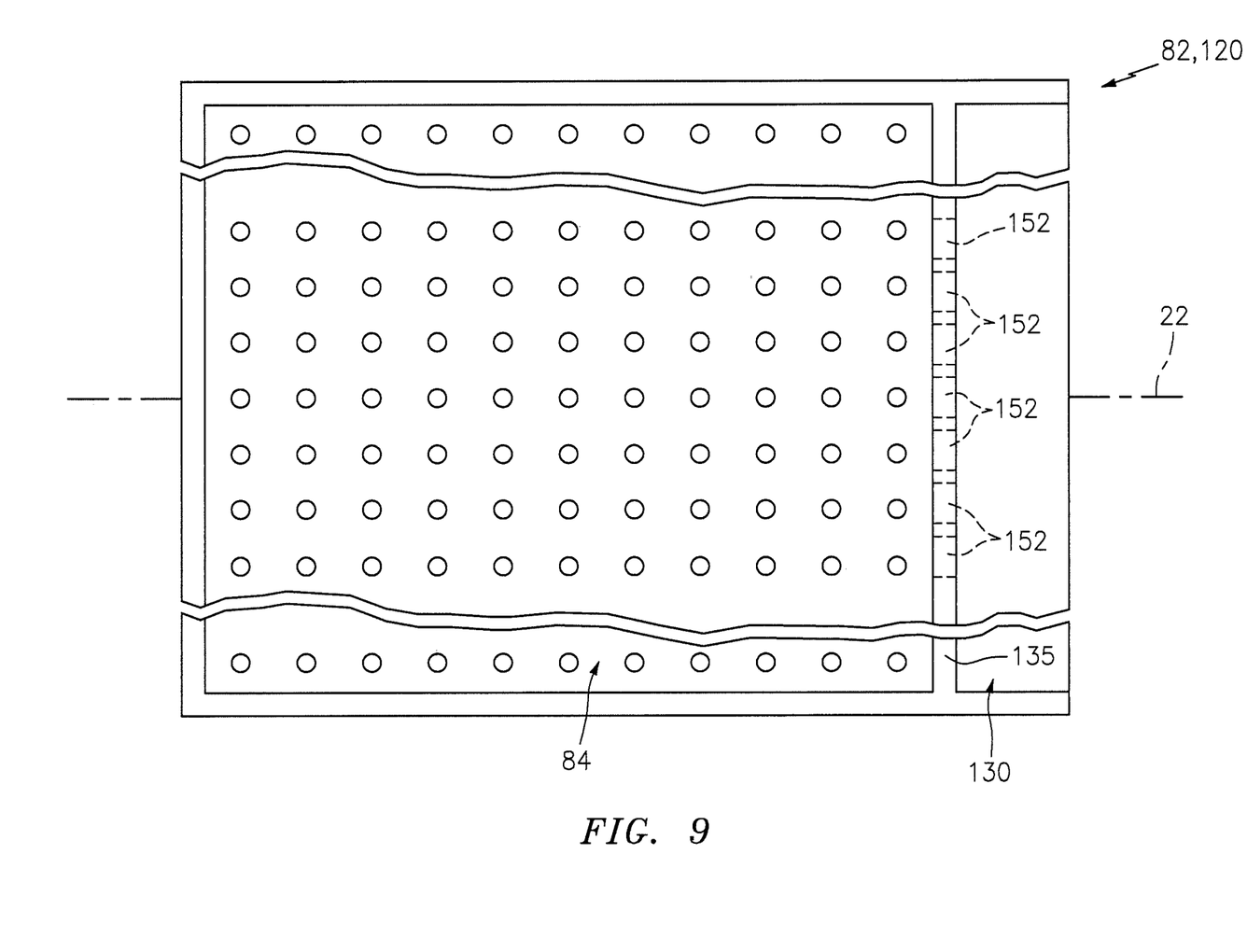
FIG. 9 is an illustration of an alternate embodiment downstream heat shield panel with a plurality of recessed cooling apertures shown by dashed lines.
Figure 10:
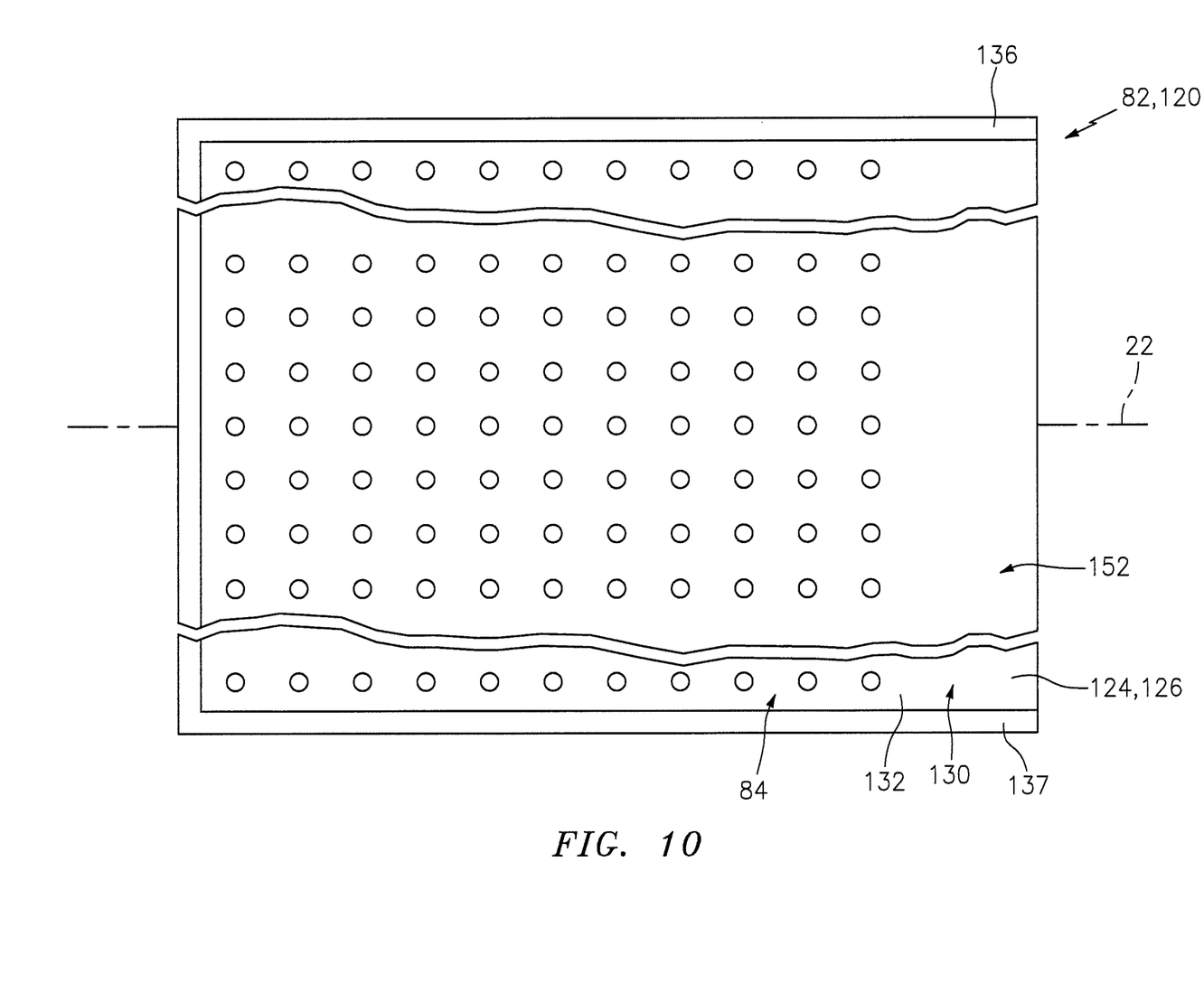
FIG. 10 is an illustration of alternate embodiment downstream heat shield panel.

One or more of the combustor walls 76 and/or 78 may each have different configurations other than those described above. For example, in some embodiments, the axial end rail 135 may be disposed adjacent and contiguous with the aft end 140. Referring to the embodiment of FIG. 9, one or more of the panels 120 may each include a plurality of slots 152. The cooling air may flow through these slots 152 and collectively form the film of cooling air for cooling the portion(s) of the heat shield 82 adjacent and/or proximate a respective one of the quench apertures 72. Referring to the embodiment of FIG. 10, one or more of the panels 120 may each be configured without the axial end rail 134. In this embodiment, the cooling aperture 152 is defined laterally between the end rails 136 and 137 and vertically between the panel base 132 and the shell 80 (not shown). In some embodiments, the panels 122 may be vertically recessed (e.g., displaced) from the panels 121 to form another riser portion. The panels 121 may also include cooling apertures similar to the cooling apertures 152 described above to film cool the panels 122. In some embodiments, the panels 122 may be omitted and/or the heat shield 82 may include additional panels upstream of the panels 120. In some embodiments, the end rail 135 may be configured with the shell 80; e.g., formed integral with or attached to the shell 80. In some embodiments, the quench aperture bodies 88 may be configured with other panels or otherwise omitted from the panels 121. The present invention, however, is not limited to the above described configurations.

The terms "forward", "aft", "inner", "outer", "radial", circumferential" and "axial" are used to orientate the components of the turbine engine assembly 60 and the combustor 62 described above relative to the turbine engine 20 and its centerline 22. One or more of these turbine engine components, however, may be utilized in other orientations than those described above. The present invention therefore is not limited to any particular spatial orientations.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:
   a combustor wall extending along an axial centerline, the combustor wall including a shell and a heat shield, and the combustor wall defining a quench aperture therethrough and defining a cavity between the shell and the heat shield;
   the shell defining a first aperture through which air is directed into the cavity;
   the heat shield including a rail that contacts the shell and that at least partially defines a second aperture configured to direct at least some of the air within the cavity out of the combustor wall and towards the quench aperture, wherein the second aperture comprises a slot which extends axially along the axial centerline through the rail, and the slot comprises a circumferentially elongated slot;
   the heat shield including an upstream surface and a downstream surface that form a boundary of a combustion chamber;
   an upstream edge of the downstream surface is radially displaced, in a direction towards the shell, from a downstream edge of the upstream surface;
   wherein the heat shield includes a first panel adjacent a second panel;
   the first panel includes the rail and the upstream surface, and the rail is at a downstream end of the first panel and is disposed upstream of the downstream edge of the upstream surface to define an open cavity at the downstream end of the first panel to direct the at least some of the air within the cavity out of the combustor wall and towards the quench aperture;
   the second panel includes the downstream surface; and
   the quench aperture extends through the second panel.

2. The assembly of claim 1, wherein the heat shield has a stepped configuration.

3. The assembly of claim 1, wherein the quench aperture extends vertically through the combustor wall; and adjacent ends of the first and the second panels are vertically displaced from one another.

4. The assembly of claim 1, wherein
   the heat shield includes a base configured as an arcuate plate; and
   the rail extends between the base and the shell.

5. The assembly of claim 1, wherein the rail is configured such that the air directed through the second aperture forms an air blanket against the heat shield that flows towards a region of the heat shield at the quench aperture.

6. The assembly of claim 1, wherein the axial centerline is substantially parallel to a portion of the heat shield through which the slot extends.

7. The assembly of claim 1, wherein the slot is one of a plurality of slots through which at least some of the air within the cavity is directed out of the combustor wall and towards the quench aperture, and wherein each of the plurality of slots extends axially along the axial centerline through the rail.

8. The assembly of claim 1, wherein the first aperture comprises an impingement aperture through which the air is directed into the cavity to impinge against the heat shield.

9. The assembly of claim 1, wherein the heat shield defines an effusion aperture through which some of the air within the cavity is directed out of the combustor wall.

10. An assembly for a turbine engine, the assembly comprising:
    a combustor wall extending along an axial centerline, the combustor wall including a shell and a heat shield, and the combustor wall defining a quench aperture through and a cavity between the shell and the heat shield;
    the shell configured to direct air into the cavity;
    the heat shield having a stepped configuration with a riser portion extending between an upstream run portion and a downstream run portion such that an upstream edge of the downstream run portion is disposed a radial distance radially outboard of a downstream edge of the upstream run portion; and
    the riser portion configured to direct at least some of the air within the cavity out of the combustor wall and towards the quench aperture;
    wherein the riser portion at least partially defines a slot through which the at least some of the air within the cavity is directed out of the combustor wall, and the slot extends radially within the riser portion; and wherein the riser portion comprises a rail that projects out from a base of the upstream run portion of the heat shield at a downstream end of the upstream run portion and upstream of the downstream edge of the upstream run portion to define an open cavity at a downstream end of the upstream run portion for directing the at least some of the air within the cavity out of the combustor wall and towards the quench aperture, the rail having a distal end that contacts the shell;

wherein the slot extends radially within and axially through the rail.

11. The assembly of claim 10, wherein the slot comprises a circumferentially elongated slot that extends axially through and circumferentially within the riser portion.

12. The assembly of claim 10, wherein the riser portion at least partially defines a plurality of slots through which the at least some of the air within the cavity is directed out of the combustor wall, and each of the plurality of slots extends radially within and axially through the riser portion and the rail.

13. The assembly of claim 10, wherein the heat shield includes
- an upstream panel that defines the upstream run portion and the riser portion, and includes the rail and the base; and
- a downstream panel that defines the downstream run portion.

14. The assembly of claim 10, wherein the upstream run portion is configured to direct some of the air within the cavity out of the combustor wall.

15. An assembly for a turbine engine, the assembly comprising:
a combustor wall extending along an axial centerline, the combustor wall including and defining a cavity between a shell and a heat shield;
the shell configured to direct air into the cavity;
the heat shield having a stepped configuration with a riser portion extending radially between an upstream run portion and a downstream run portion such that at least an upstream end of the downstream run portion is radially recessed into the combustor wall from a downstream end of the upstream run portion;
the riser portion configured to direct some of the air within the cavity out of the combustor wall to film cool the downstream run portion; and
the upstream run portion configured to direct some of the air within the cavity to effuse out of the combustor wall;
wherein the riser portion is configured with a plurality of slots formed in a rail through which the some of the air within the cavity is directed out of the combustor wall, and wherein a circumferentially adjacent pair of the plurality of slots each extends axially through the rail along the axial centerline, the rail extending from the heat shield to the shell at the downstream end of the upstream run portion and upstream of a downstream edge of the upstream run portion, thereby defining an open cavity at the downstream end of the upstream run portion;
wherein the combustor wall defines a quench aperture through the shell and the downstream run portion, and the riser portion is configured to use the plurality of slots and the open cavity to direct the air within the cavity out of the combustor wall toward the quench aperture.

16. The assembly of claim 15, wherein the upstream run portion is configured with a plurality of effusions apertures.

* * * * *